US010992928B1

(12) United States Patent
Rehder et al.

(10) Patent No.: US 10,992,928 B1
(45) Date of Patent: Apr. 27, 2021

(54) CALIBRATION SYSTEM FOR CONCURRENT CALIBRATION OF DEVICE SENSORS

(71) Applicant: Facebook Technologies, LLC, Menlo Park, CA (US)

(72) Inventors: Joern Rehder, Winterthur (CH); Janosch Nikolic, Zurich (CH); Dong Yang, Milpitas, CA (US); Oskar Linde, San Carlos, CA (US); Jijie Xu, San Jose, CA (US); Kenneth Chi Kin Ng, Santa Clara, CA (US); Steven G. McClellan, Santa Clarita, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/890,523

(22) Filed: Jun. 2, 2020

Related U.S. Application Data

(60) Provisional application No. 62/967,876, filed on Jan. 30, 2020.

(51) Int. Cl.
*H04N 17/00* (2006.01)
*G06T 7/80* (2017.01)

(52) U.S. Cl.
CPC ............ *H04N 17/002* (2013.01); *G06T 7/80* (2017.01); *G06T 2207/30204* (2013.01)

(58) Field of Classification Search
CPC .................................................. G02B 27/017
See application file for complete search history.

(56) References Cited

U.S. PATENT DOCUMENTS

| 7,649,532 | B2 | 1/2010 | Cameron et al. | |
|---|---|---|---|---|
| 2004/0135744 | A1 | 7/2004 | Bimber et al. | |
| 2010/0014088 | A1 | 1/2010 | Wiki | |
| 2015/0279113 | A1 | 10/2015 | Knorr et al. | |
| 2018/0234676 | A1* | 8/2018 | Cole | H04N 17/002 |
| 2019/0007135 | A1 | 1/2019 | Stout et al. | |
| 2019/0051198 | A1* | 2/2019 | Nimmagadda | G05D 1/0005 |

* cited by examiner

*Primary Examiner* — Paulos M Natnael
(74) *Attorney, Agent, or Firm* — Fenwick & West LLP

(57) ABSTRACT

A calibration system includes a grid assembly, a platform, and a controller. The grid assembly includes at least one planar grid. The platform couples to a device under test (DUT) and move the DUT to a plurality of test positions in accordance with a motion sequence. Each test position is reached by a rotation about at most two different axes, and as the DUT moves through the motion sequence, at least one camera on the DUT captures image information describing portions of the grid assembly and an inertial measurement unit (IMU) on the DUT captures IMU information. The controller determines calibration information for the at least one camera on the DUT and for the IMU based in part on a parameterized model of the motion sequence of the DUT, the captured image information, and the captured IMU information.

20 Claims, 7 Drawing Sheets

600

Move a platform coupled to a device under test (DUT) to a plurality of test positions in accordance with a motion sequence while at least one camera on the DUT captures image information describing portions of a grid assembly and an IMU on the DUT captures IMU information
610

↓

Determine calibration information for the at least one camera and for the IMU using a parameterized model of the motion sequence of the DUT, the captured image information, and the captured IMU information
620

↓

Update DUT with the calibration information
630

FIG. 6

CALIBRATION SYSTEM FOR CONCURRENT CALIBRATION OF DEVICE SENSORS

CROSS REFERENCE TO RELATED APPLICATIONS

This application claims the benefit of U.S. Provisional Application No. 62/967,876 filed Jan. 30, 2020, which is incorporated by reference in its entirety.

FIELD OF THE INVENTION

This disclosure relates generally to calibration systems, and more specifically to concurrent calibration of cameras and inertial measurement units on a device under test (e.g., headset).

BACKGROUND

Virtual reality and/or augmented reality head-mounted displays conventionally include various sensors (e.g., cameras, inertial measurement units etc.) and it is important that these sensors be calibrated in order for the headset to perform efficiently. Calibration typically involves coupling the headset to various calibration stations that are designed to calibrate a single sensor type. For example, one calibration station for cameras on a headset, a different calibration station for an inertial measurement unit on the headset, and so on. Having a large number of calibration stations is generally not efficient and cost effective.

SUMMARY

A calibration system for concurrent calibration of one or more inertial measurement units (IMUs) and one or more cameras that are all on a device under test (DUT). The DUT may be, e.g., a headset. The calibration assembly includes a grid assembly, a platform, and a calibration controller. The grid assembly includes at least one grid. In some embodiments, the grid assembly includes three planar grids positioned relative to each other to form a corner structure. The platform is configured to couple to a DUT. The platform is configured to move the DUT to a plurality of test positions in accordance with a motion sequence. The platform moves the DUT to each test position. In some embodiments, the platform moves the DUT to each test position by a rotation about at most two different axes. As the DUT moves through the motion sequence, at least one camera on the DUT captures image information describing portions of the grid assembly and one or more IMUs on the DUT capture IMU information. The calibration controller is configured to determine calibration information for the at least one camera on the DUT and for the one or more IMUs based in part on a parameterized model of the motion sequence of the DUT, the captured image information, and the captured IMU information.

In some embodiments, the calibration system performs a method. The method comprising moving a platform coupled to a DUT to a plurality of test positions in accordance with a motion sequence. And each test position is reached by a rotation about at most two different axes, and as the DUT moves through the motion sequence, at least one camera on the DUT captures image information describing portions of the grid assembly and one or more IMUs on the DUT capture IMU information. The method also includes determining calibration information for the at least one camera on the DUT and for the one or more IMUs based in part on a parameterized model of the motion sequence of the DUT, the captured image information, and the captured IMU information.

In some embodiments, a non-transitory computer-readable storage medium storing instructions that, when executed by one or more processors, cause the one or more processors to perform operations comprising moving a platform coupled to a DUT to a plurality of test positions in accordance with a motion sequence. And each test position is reached by a rotation about at most two different axes, and as the DUT moves through the motion sequence, at least one camera on the DUT captures image information describing portions of the grid assembly and one or more IMUs on the DUT captures IMU information. Calibration information is determined for the at least one camera on the DUT and for the one or more IMUs based in part on a parameterized model of the motion sequence of the DUT, the captured image information, and the captured IMU information.

BRIEF DESCRIPTION OF THE DRAWINGS

FIG. 6 is a flowchart illustrating a process for calibrating a device under test using the calibration system of FIG. 4, according to one or more embodiments.

Figure 1A:
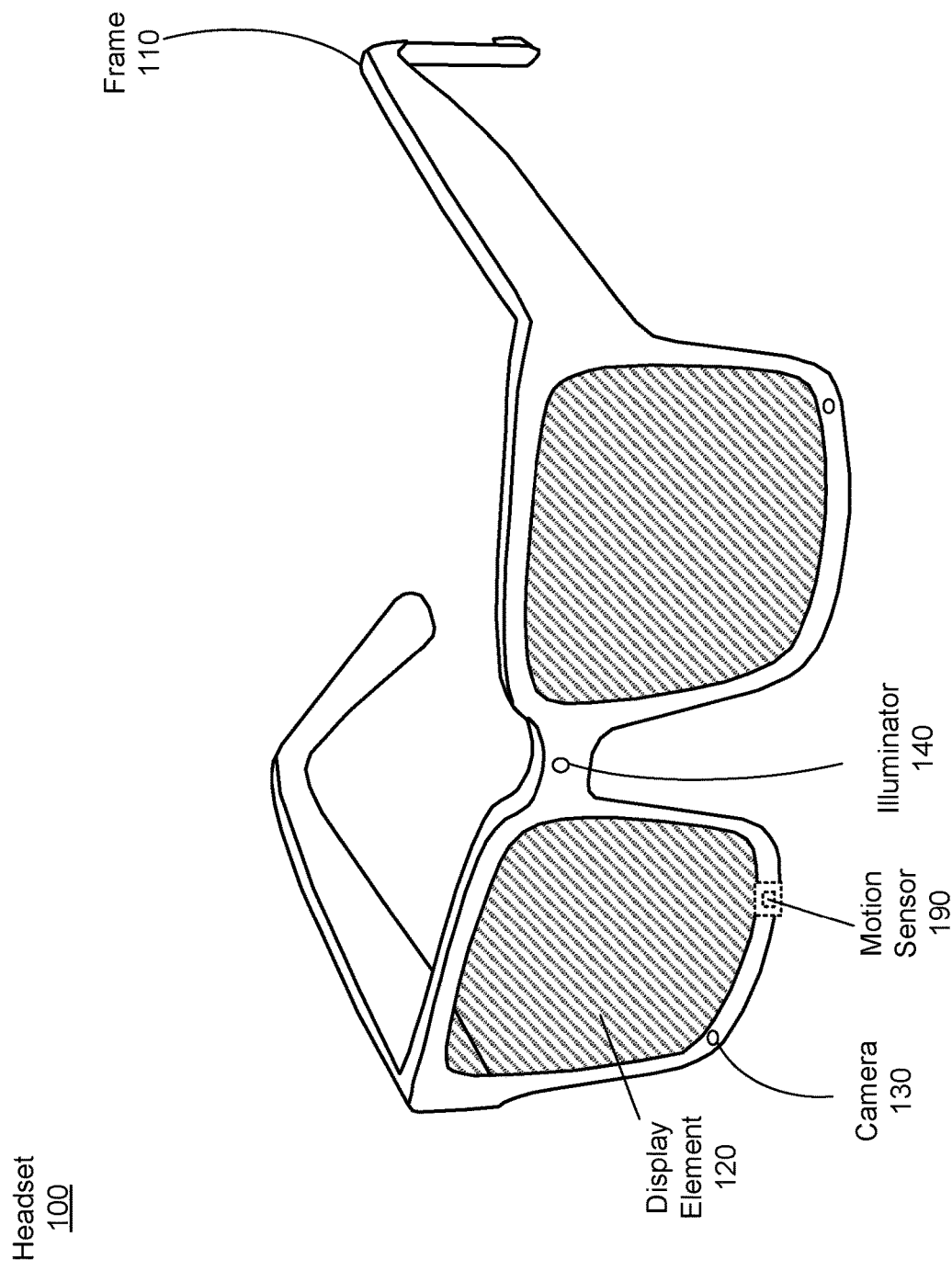
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A device under test (DUT) for an artificial reality environment includes a plurality of sensors. A DUT may be, e.g., a headset. The sensors include a camera assembly and one or more inertial measurement units (IMUs). The camera assembly includes a plurality of cameras that capture image information describing a local area around the DUT. Image information is information that describes one or more images taken by one or more cameras. In some embodiments, the image information may include one or more images and/or depth information of a local area. Each IMU generates one or more measurement signals in response to motion of the DUT. An IMU and/or some other device may use the one or more measurement signals to produce IMU information. IMU information may include respective positions of one or more IMUs, respective accelerations of the one or more IMUs, respective angular velocities of the or more IMUs, or some combination thereof.

A calibration system described herein can perform concurrent calibration of different sensors (e.g., a camera assembly and one or more IMUs) on a DUT. The calibration system includes a grid assembly, a platform, and a controller. In some embodiments, at least the grid assembly and the platform are enclosed within an enclosure that is opaque to light.

The grid assembly includes at least one planar grid (e.g., display). In some embodiments, the grid assembly may include three planar grids. For example, the three planar grids may be positioned relative to each other to form a corner structure. And each of the at least one planar grid is configured to have a plurality of fiducial markers. As discussed in detail below with regard to FIGS. 4 and 5, the fiducial markers form a code that allow for association with a panel and a position on that panel.

The platform is moveable stage that a DUT can be coupled to. The platform is configured to move the DUT through a plurality of test positions in accordance with a motion sequence. The platform is configured to reach each test position by a rotation about a first axis, a rotation about a second axis, or a rotation about the first axis and a rotation about the second axis. As the platform moves the DUT through the motion sequence, the camera assembly captures image information describing portions of the grid assembly (e.g., one or more planar grids, the corner structure, etc.) and the one or more IMUs on the DUT capture respective IMU information.

The calibration controller controls the calibration system. The calibration controller determines calibration information for the camera assembly and for the one or more IMUs based in part on a parameterized model of the motion sequence of the DUT, the captured image information, and the captured IMU information. The calibration controller concurrently determines the calibration information for the camera system and the one or more IMUs. The calibration controller updates the DUT with the determined calibration information.

The calibration system concurrently determines calibration information for different sensors in a single platform over the same time period. In contrast, conventionally a plurality of calibration stations is used to calibrate the different sensors on a DUT, and the calibration is done over different time periods. For example, conventionally a camera on a DUT may be calibrated using one calibration system, and then a separate calibration station could be used to calibrate an IMU on the DUT. Moreover, each testing position is separated from an adjacent testing position by at most 2 rotations. Accordingly, the calibration system is able to move through the motion sequence faster than calibration stations which use 3 or more degrees of freedom (e.g., translation and/or rotation) to transition between positions. Moreover, as 2 rotations between adjacent test positions is a minimal actuation, the calibration system may have a relatively long mean time between failures versus a system with which uses 3 or more degrees of freedom between transition positions. Accordingly, in the long run the calibration system may be cheaper than conventional systems.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a motion sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more cameras 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more cameras 130 capture image information (e.g., images) describing the portion of the local area that include the light from the illuminator 140. As illustrated, FIG. 1A shows a single illuminator 140 and two cameras 130. In alternate embodiments, there is no illuminator 140 and at least two cameras 130. And in other embodiments, there is only a single camera 130.

The DCA controller computes depth information for the portion of the local area using the captured image information and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The motion sensor 190 generates one or more measurement signals related to a pose (position and/or orientation), and/or a change of pose, of the headset 100. The motion sensor 190 may be located on a portion of the frame 110 of the headset 100. The motion sensor 190 may include an inertial measurement unit (IMU). Examples of motion sensor 190 include: one or more accelerometers, one or more gyroscopes, one or more magnetometers, another suitable type of sensor that senses motion, a type of sensor used for error correction of the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data and/or monochrome image data. For example, the PCA may include one or more red-green-blue (RGB) cameras and/or one or more monochrome cameras that capture images of some or all of the local area. In some embodiments, some or all of the cameras 130 of the DCA may also function as the PCA. The images captured by the PCA and the depth information determined by the DCA may be used to determine parameters of the local area, generate a model of the local area, update a model of the local area, or some combination thereof. Together, information from the DCA and the motion sensor 190 are used to track the pose (e.g., location and orientation) of the headset 100 within the room. Additional details regarding the components of the headset 100 are discussed below in connection with FIG. 1B.

Figure 1B:
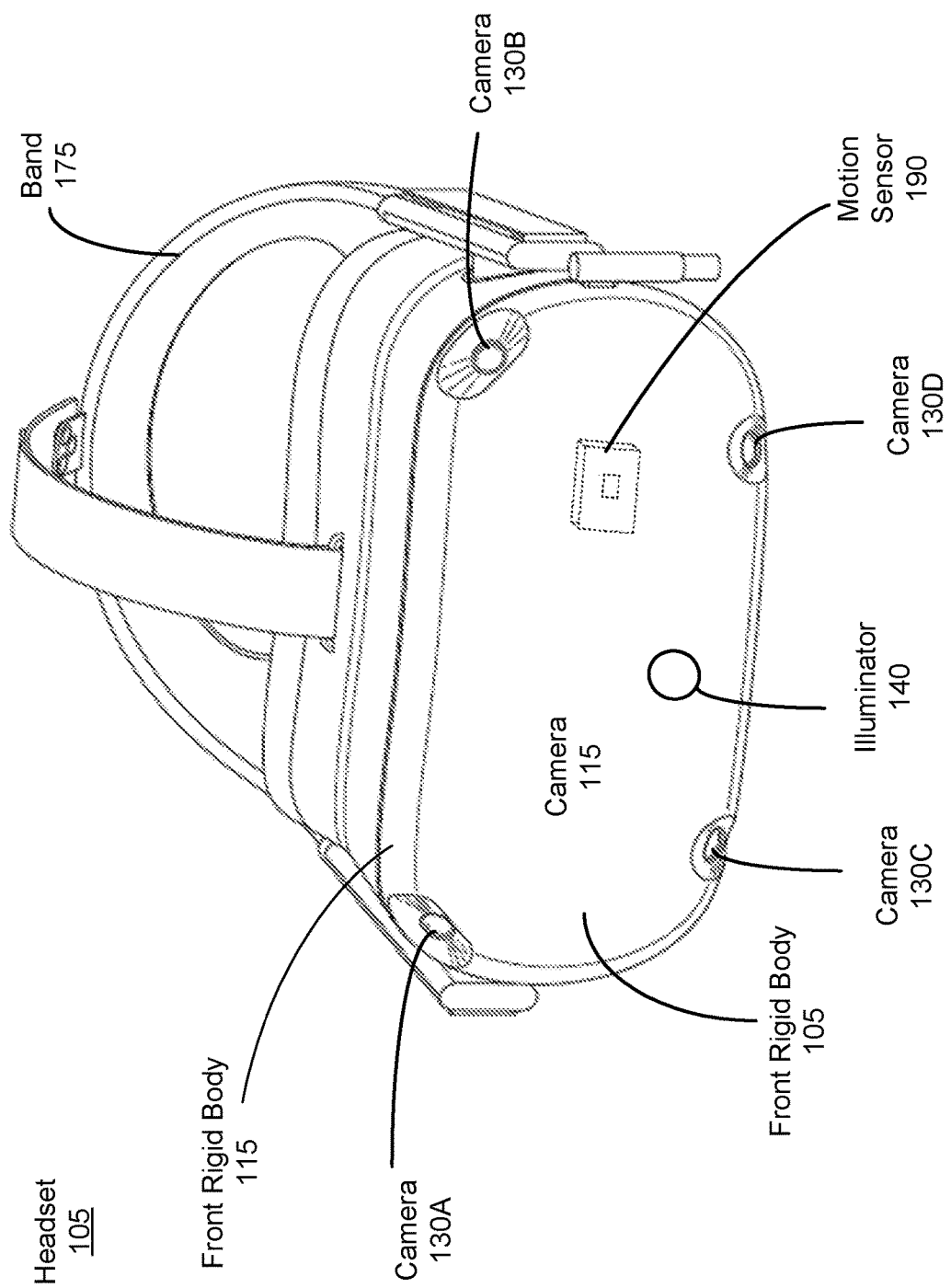
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the headset 105 are at least partially transparent in the visible band (~380 nm to 750 nm), and portions of the headset 105 that are between the front side of the headset 105 and an eye of the user are at least partially transparent (e.g., a partially transparent electronic display). The headset 105 includes a front rigid body 115 and a band 175. The headset 105 includes many of the same components described above with reference to FIG. 1A, but modified to integrate with the HMD form factor. For example, the HMD includes a display assembly, a DCA, an audio system, and a motion sensor 190. In this embodiment, the headset 105 includes four cameras, specifically, imagining devices 103A, 130B, 130C, and 130D. FIG. 1B shows the illuminator 140, the cameras 130, and the motion sensor 190.

Figure 2:
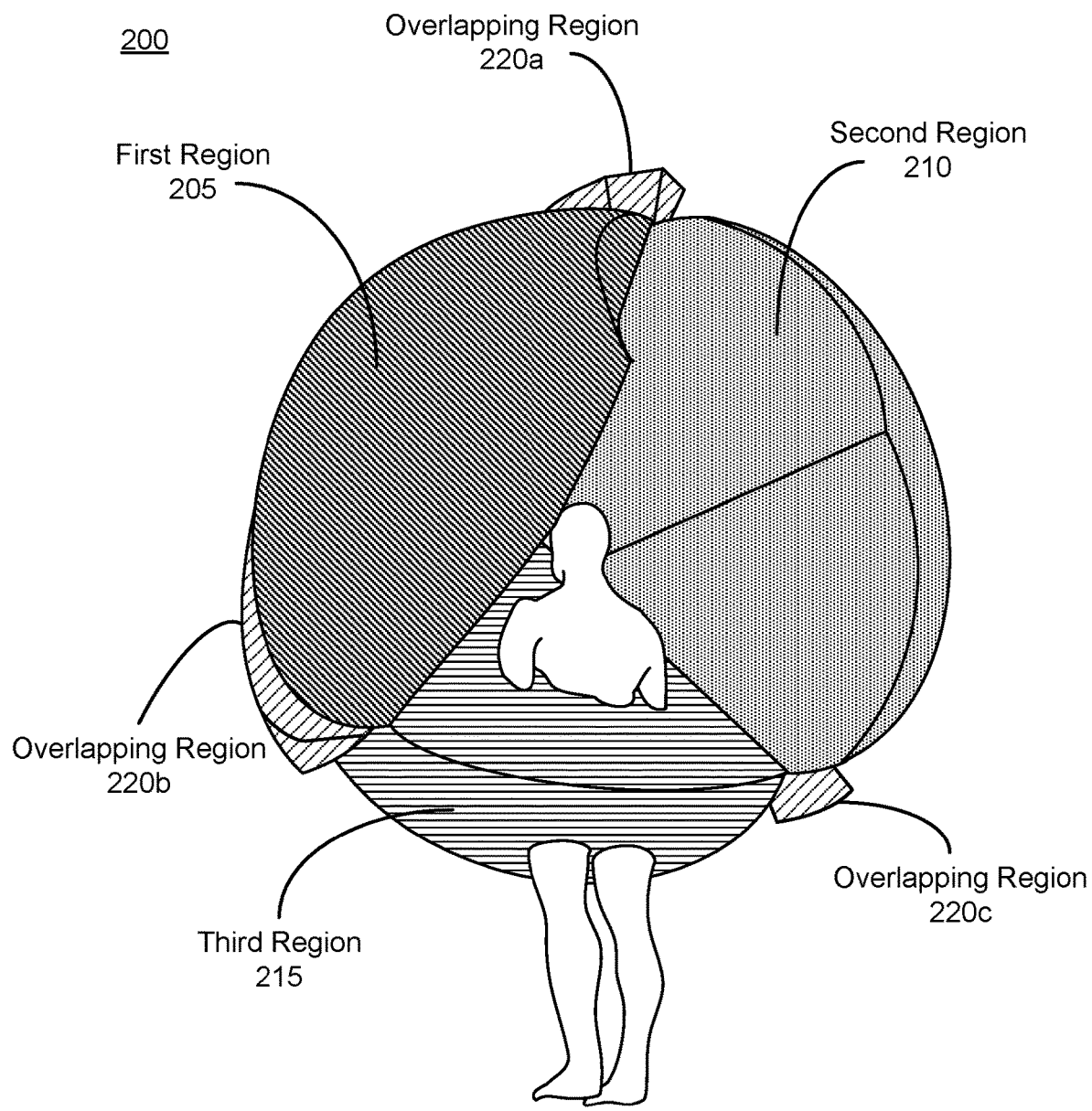
FIG. 2 illustrates a tracking region of the headset of FIG. 1B.

FIG. 2 illustrates a tracking region 200 of the headset 105 of FIG. 1B. The tracking region 200 is a portion of the local area surrounding the headset 105 that is viewable by the DCA on the headset 105. Objects within the tracking region 200 are detected by the imagining devices 103A, 130B, 130C, and 130D, which capture image information of the objects. As illustrated in FIG. 2, the tracking region 200 is composed of several smaller regions, each region corresponding to a type of coverage provided by the fields of view of the imagining devices 103A, 130B, 130C, and 130D. In the embodiment of FIG. 2, the tracking region 200 comprises a first region 205, a second region 210, a third region 215, and three overlapping regions 220A-C.

The first region 205 represents a monocular region of coverage. In the embodiment of FIG. 2, the first region 205 is provided by the field of view of the camera 130B. As described with regards to FIG. 1B, the camera 130B is positioned at the upper left corner of the front rigid body 115 of the headset 105 and is oriented to point outwards and upwards towards the sides and top of the front rigid body 115, and the camera 130B has a field of view ranging between 120 to 180 degrees. Thus, the first region 205 includes objects of the local area located in the user's upper left field of view.

The second region 210 represents a monocular region of coverage. In the embodiment of FIG. 2, the second region 210 is provided by the field of view of the camera 130A. As described with regards to FIG. 1B, the camera 130A is positioned at the upper right corner of the front rigid body 115 of the headset 105 and is oriented to point outwards and upwards towards the sides and top of the front rigid body 115, and the camera 130A has a field of view ranging between 120 to 180 degrees.

The third region 215 represents a stereoscopic region of coverage. In the embodiment of FIG. 2, the third region 215 is provided by the fields of view of cameras 125, 130. As described with regards to FIG. 1, the cameras 130C, 130D are positioned along the bottom edge of the front rigid body 115 and are oriented to point downwards and parallel (or nearly parallel) to each other, and the cameras 130C, 130D have a field of view ranging between 120 to 180 degrees. The cameras 130C, 130D have substantially the same orientation such that the fields of view of the camera 130C and the camera 130D entirely (or nearly entirely) overlap, providing stereoscopic coverage for the objects within the third region 215.

The overlapping regions 220A-C each represent a stereoscopic region of coverage. In the embodiment of FIG. 2, the overlapping regions 220A-C are provided by overlapping fields of view between adjacent cameras (e.g., cameras 130A and 130B, camera 130A and 130C, and cameras 130 B and 130D). The overlapping regions 220A-C between adjacent cameras allow details from a first field of view to be handed over to a second field of view such that frames from different cameras may be stitched together. Objects that fall within an overlapping region 220A-C may also be used to calibrate the cameras of the headset 105.

Figure 3:
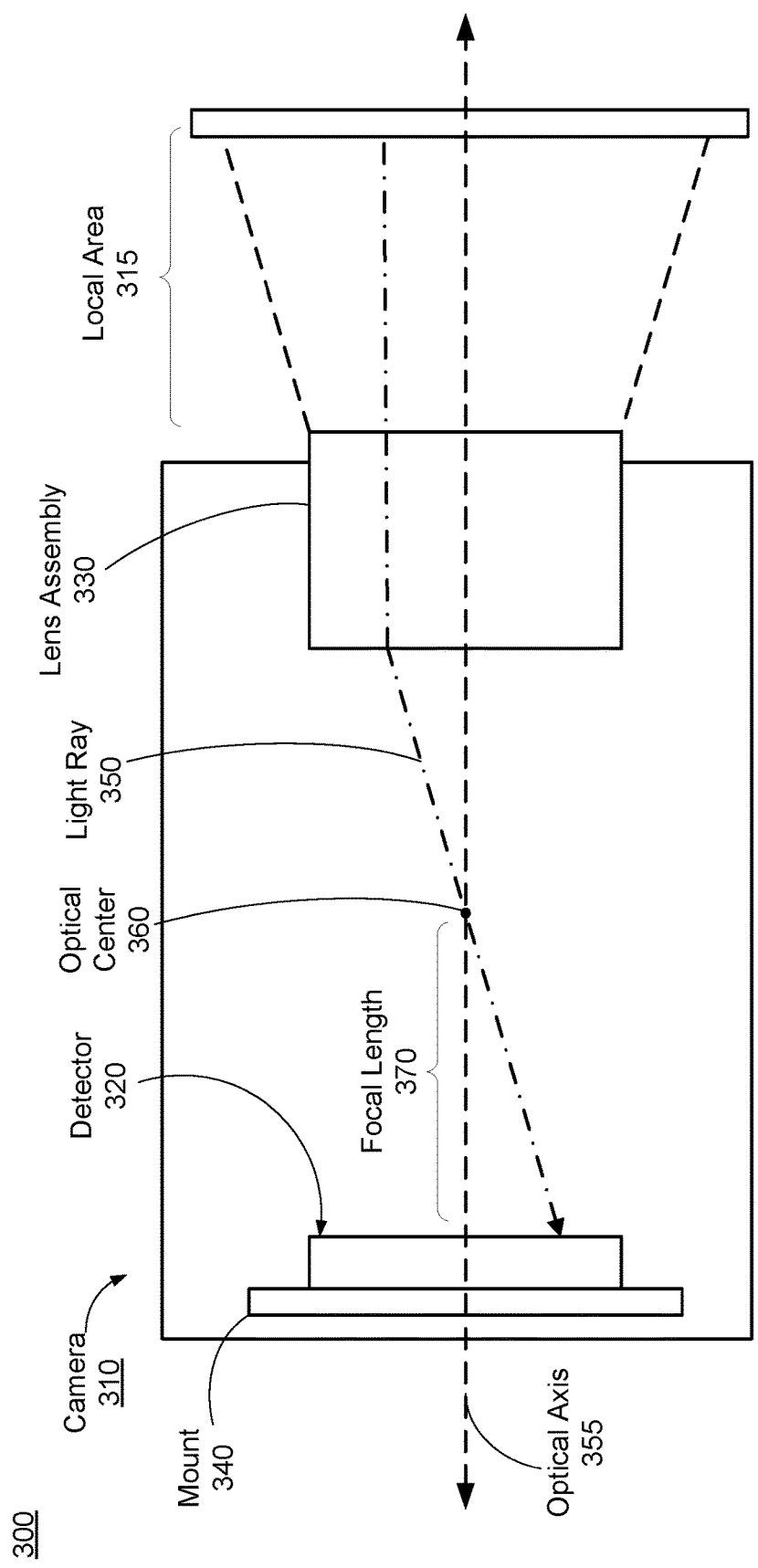
FIG. 3 illustrates a cross-section of a camera, according to one or more embodiments.

FIG. 3 illustrates a cross-section 300 of a camera 310, according to one or more embodiments. The camera 310 may be an embodiment of the camera 130 described above with regard to FIG. 1A and/or the cameras 130A-D described above with regard to FIGS. 1B and 2. The camera 310 captures image information describing a local area 315, for use in artificial reality applications. The camera 310 includes a detector 320 and a lens assembly 330.

The detector 320 is an imaging sensor that captures image information of the local area 315. The detector 320 captures the image information using an array of photo-sensitive pixels, in which each pixel collects image data associated with a particular location in the local area 315. The detector 320 is coupled to a mount 340. In some embodiments, the mount 340 may be a printed circuit board (e.g., control circuitry for the detector 320).

The lens assembly 330 includes one or more optical elements. An optical element may be a lens, an aperture, a Fresnel lens, a filter, some other suitable optical element that facilitates focusing light on the detector 320, or some combination thereof. In some embodiments, one or more of the optical elements in the lens assembly 330 may have one or more coatings, such as anti-reflective coatings. The lens assembly 330 is a fixed-focus lens (i.e., focus is set once). In alternate embodiments, focus may be varied (e.g., the camera 310 may have an autofocus and/or manual focus capability). The lens assembly 330 is approximately a 2.7 mm lens, but in other embodiments, it may have different focal lengths (e.g. 12 mm, 28 mm, 50 mm, etc.).

The detector 320 and the lens assembly 330 are positioned along an optical axis 355, such that light from the lens assembly 330 is focused on the detector 320. In this configuration, the detector 320 captures the light rays, such as light ray 350, from the lens assembly 330 and converts the light rays into an image. Properties of the lens assembly 330 include an optical center 360 and a focal length 370. The focal length 370 is a distance behind a rear lens node (i.e., the optical center 360) of the lens assembly 330 at which all light ray paths parallel to the lens axis converge (i.e., infinity focus)—and this convergence occurs at the detector 320.

The optical center 360 of the lens assembly 330 is the location where rays of light from different sources entering the lens are assumed to cross. When an image is in focus, an image plane of the lens assembly 330 is located on the detector 320; whereas, an unfocused image indicates that the image plane is not located on the detector 320. Artificial reality systems may use the location of the optical center 360 to map locations in the local area 315 to individual pixels in the detector 320. In some embodiments, the lens assembly 330 may have two optical centers. For example, the lens assembly 330 may have a first optical center that relates to external light rays entering the lens assembly 330 and a second optical center for the projection of the light rays to the detector 320. Determining the location of the second optical center provides a relationship between the angle of an incoming light ray and the distance from which the light ray lands on the detector 320, such that a mapping between ray-angle space and pixel space can be created. Therefore, the location of the optical center 360 of the camera 310 is important for operation of an artificial reality system.

Figure 4:
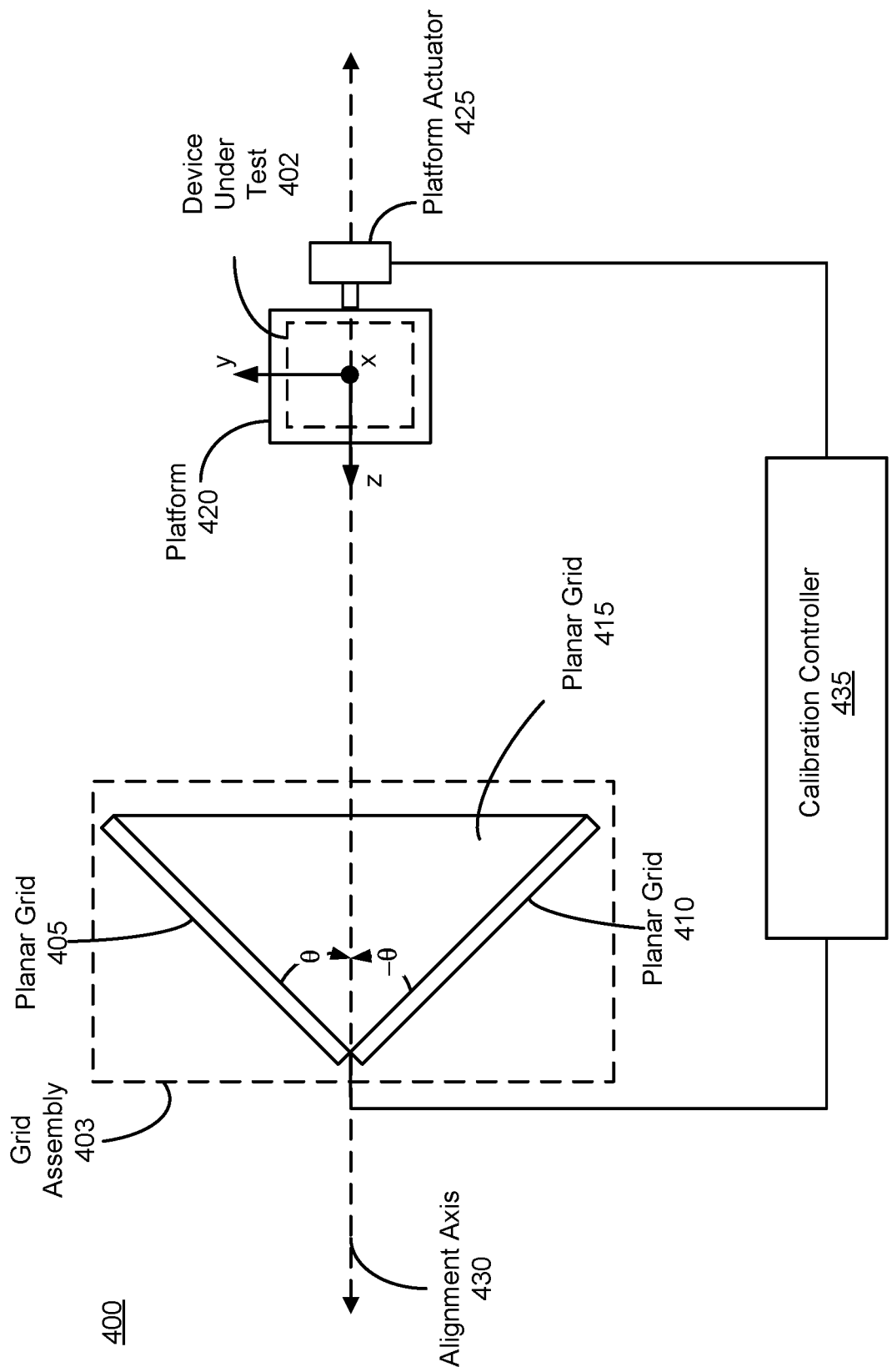
FIG. 4 is a calibration system for a device under test, according to one or more embodiments.

FIG. 4 is a calibration system 400 for a device under test (DUT) 402, according to one or more embodiments. The DUT 402 may be, e.g., the headset 100, the headset 105, some other headset including one or more cameras and one or more motion sensors, or some other device that includes one or more cameras and one or more motion sensors. Some embodiments of the calibration system 400 have different components than those described here. The calibration system 400 includes a grid assembly 403, a platform 420, a platform actuator 425, and a calibration controller 435. In some embodiments, an enclosure surrounds some or all of the calibration system 400 to prevent ambient light from entering the testing area during the calibration process. Similarly, in some cases, functions can be distributed among the components in a different manner than is described here.

As described in greater detail below, the calibration system 400 determines calibration information of the DUT 402. The calibration information of the DUT 402 ensures that the DUT 402 accurately estimates the motion of the devices (e.g., its ego-motion, its own motion, the motion of an object or person that it is attached to, or some combination thereof) and accurately maps locations in the local area being imaged by the cameras of the DUT 402. The calibration information of the DUT 402 may include extrinsic information of the cameras on the DUT 402 (e.g., a location and orientation of each cameras on the DUT 402), intrinsic information of the cameras (e.g., distortion parameters, focal length, center projection on an image plane, etc.), extrinsic information of the IMU (e.g., a location and orientation of each IMU on the DUT 402), intrinsic information of the IMU of the DUT 402 (e.g., sensor offsets (biases), sensor sensitivities (scale factors), sensor non-orthogonality's (cross-talk), etc.), or some combination thereof. For example, in some embodiments, the calibration information may include all of the intrinsic and all of the extrinsic information for both the camera and the one or more IMUS.

The grid assembly 403 presents a plurality of fiducial markers. In some embodiments, the planar grids 405, 410, 415 are electronic displays (e.g., LCD, OLED, etc.) that display a plurality of fiducial markers in a grid-like pattern. Alternatively, the planar grids 405, 410, 415 are printed targets that are illuminated with an external illumination source that is part of the grid assembly 403. Each fiducial marker corresponds to a particular location in a viewable area imaged by the DUT 402 undergoing calibration. In the embodiment of FIG. 4, each fiducial marker is configured to appear as a small light source that is displayed by a planar grid. A display pattern may be programmed for each planar grid 405, 410, 415 to control the display of the fiducial markers on the planar grids 405, 410, 415. The display pattern may specify which fiducial markers to display, when to display them, and for how long to display them. The planar grids 405, 410, 415 are described in detail below with regard to FIG. 5. In general, the planar grids 405, 410, 415 include a plurality of fiducial markers. For example, a planar grid may include an array of 2000×2000 fiducial markers. Additionally, in some embodiments, fiducial markers may not be present or may be of a different size to indicate a particular location on the planar grid.

The planar grids 405, 410, 415 are positioned relative to each other along an alignment axis 430 to form a corner structure. Note that this is just one embodiment, and that in other embodiments there may be more or less planar grids (e.g., a single planar grid). In the embodiment of FIG. 4, the planar grid 405 is positioned at an angle, θ, from the alignment axis 430, and the planar grid 410 is positioned at an angle, -θ, from the alignment axis 430. The planar grid 415 is positioned above the planar grids 405, 410 such that a bottom edge of the planar grid 415 is adjacent to the top edges of the planar grids 405, 410. The relative positioning of the planar grids 405, 410, 415 form a corner structure. In some embodiments, θ is 45 degrees such that the planar grid 405 and the planar grid 410 are positioned at a substantially right angle from each other and are adjacent along an edge forming a line that is bisected by and perpendicular to the alignment axis 430. In other embodiments, the angles between the planar grids 405, 410, 415 and the alignment axis 430 may vary and may not be symmetrical, given that the angles are large enough to allow the planar grids 405, 410 to extend beyond the field of view of the cameras on the DUT 402 undergoing calibration. And in some embodiments, grid assembly 403 may include a planar grid below the planar grids 405, 410 such that a top edge of the planar grid is adjacent to the bottom edges of the planar grids 405, 410.

The platform 420 is a platform that is configured to couple to the DUT 402. In some embodiments, the platform 420 is thermally-regulated to maintain the DUT 402 at some temperature (e.g., a thermal calibration temperature, a steady state temperature, etc.). In the embodiment of FIG. 4, the platform 420 positions the DUT 402 approximately 200 mm from the face of each planar grid 405, 410, 415. In one embodiment, an operator can manually adjust the position of the platform 420. In another embodiment, the position of the platform 420 can be automatically adjusted by the calibration controller 435 via the platform actuator 425. In the embodiment of FIG. 4, the platform 420 is configured to couple to one DUT 402 but can be configured to couple to multiple headsets in other embodiments. In some embodiments, mounting components on the platform 420 are used to couple the DUT 402 in a specific position such that if a first DUT 402 were replaced by a second headset for calibration, the second headset would also be held in the specific position. The planar grids 405, 410, 415 are positioned before the platform 420, such that a field of view of the DUT 402 includes a portion of all of the planar grids 405, 410, 415.

The platform actuator 425 is an actuator configured to control movement of the platform 420. The platform actuator 425 may position the platform 420 at a desired distance before the planar grids 405, 410, 415 by translating the platform 420 along the alignment axis 430. In addition, the platform actuator 425 may be configured to move the platform 420 according to a motion sequence during the calibration process. The motion sequence moves the DUT 402 sequentially through a plurality of test positions. And each test position is reached by rotation about at most two different axes. For example, as illustrated each test position is reached by rotation about a z axis and/or a rotation about a y axis. And in some embodiments, the x axis is canted with respect to gravity, thereby allowing for calibration of the one or more IMU from static measurements alone. The platform actuator 425 may perform the motion sequence in accordance with calibration instructions received from the calibration controller 435.

The calibration controller 435 is configured to control the calibration system 400. The calibration controller 435 may be coupled to the DUT 402, the platform 420, the platform actuator 425, the planar grids 405, 410, 415, or some combination thereof. In some embodiments, the calibration controller 435 may command the platform actuator 425 to adjust the position of the platform 420 (e.g., rotation or translation).

In embodiments where the planar grids 405, 410, 415 are electronic displays, the calibration controller 435 commands the planar grids 405, 410, 415 to display a plurality of fiducial markers in accordance with a display pattern. In alternate embodiments, where the planar grids 405, 410, 415 are targets illuminated by an external illumination source, the calibration controller 435 may instruct the external illumination source to illuminate some or all of one or more of the planar grids 405, 410, 415 in accordance with the display pattern. The display pattern may specify which fiducial markers to display, when to display each fiducial marker, and for how long to display each fiducial marker. For example, the calibration controller 435 may specify a plurality of fiducial markers to display for a first-time period, then not display for a second-time period, and then display again for the first-time period (i.e., an alternating pattern). The calibration controller 435 may specify the length of each time period. In addition, the calibration controller 435 may command each planar grid 405, 410, 415 to display fiducial markers in accordance with a different display pattern such that the planar grids 405, 410, 415 may display or not display fiducial markers at the same time.

The calibration controller 435 commands the platform actuator 425 to move in accordance with a motion sequence. The motion sequence determines the movement of the DUT 402 during the calibration process. The motion sequence moves the DUT 402 sequentially through a plurality of test positions. And each test position is reached by rotation about at most two different axes (e.g., the z axis and the x axis). In some embodiments, a motion sequence may specify the platform actuator 425 to move along an arc, such that the distance between a center of the planar grids 405, 410, 415 and the DUT 402 remains constant.

In some embodiments, the calibration controller 435 instructs the cameras on the DUT 402 to continuously capture image information describing a local area and the IMU to continuously collect IMU information as the platform actuator 425 moves the DUT 402. In some embodiments, at each test position at least one camera on the headset captures one or more images of portions of the grid assembly 403 and an IMU on the headset captures IMU information. In some embodiments, the calibration controller 435 also instructs the cameras on the DUT 402 to capture image information describing a local area and the IMU to collect IMU information as the platform actuator 425 moves the DUT 402 from one test position to the next test position.

In some embodiments, the calibration controller 435 instructs the cameras on the DUT 402 to capture image information and the IMU to collect IMU information as the platform actuator 425 moves the DUT 402

In the embodiment of FIG. 4, the local area is determined by a field of view of the cameras on the DUT 402 and includes portions of the planar grids 405, 410, 415. In some embodiments, the calibration controller 435 synchronizes capturing image information using the cameras with the display patterns of the planar grids 405, 410, 415. In this configuration, the cameras may capture a first image of a portion of the planar grid 405 displaying fiducial markers, a second image of a portion of the planar grid 410 displaying fiducial markers, and a third image of a portion of the planar grid 415 displaying fiducial markers. In addition to capturing images of the planar grids 405, 410, 415, the DUT 402 captures IMU information from the motion sensor (i.e., one or more IMUS) on the DUT 402 during the motion sequence. The IMU information may include a position of the IMU, acceleration of the IMU, angular velocity of the IMU, or some combination thereof. The calibration controller 435 synchronizes each captured image (e.g., image information) with the IMU information corresponding to the time of the captured image.

The calibration controller 435 analyzes the captured image information and corresponding IMU information to determine calibration information of the DUT 402. In some embodiments, the captured information is obtained while the DUT 402 is in motion and the captured image information may include motion blur, which is characterized by an object appearing as a blob or an elongated blob depending on the exposure length of the camera. Since the positions of each of the fiducial markers on the planar grids 405, 410, 415 are known, each blob or fiducial marker can be mapped to a specific location within a captured image of the image information based in part on the coding of the fiducials. At each test position, the calibration controller 435 extracts positions of where fiducials project onto images taken by the camera images. The calibration controller 435 uses the extracted positions to determine the calibration information of the DUT 402.

In the embodiment of FIG. 4, the calibration controller 435 models the motion of the DUT 402 and predicts IMU information and image information and then compares the predicted data to the actual data captured.

The calibration controller 435 models a trajectory of the DUT 402 as a smooth motion in space from one test position to another test position, as the DUT 402 is moved through the plurality of test positions. Accordingly, for each set of adjacent test positions, the calibration controller 435 parameterizes the motion to output a prediction of IMU information of the IMU along a trajectory that includes the adjacent test positions. Using the predicted IMU information, the calibration controller 435 predicts the image information that would be captured by the cameras along the trajectory and at each of the test positions that bound the trajectory. The image information includes the fiducial markers on the planar grids 405, 410, 415. The calibration controller 435 optimizes the predicted IMU information and image information versus the actual IMU information and image information captured by the cameras for all of the trajectories to determine the calibration information of each camera.

In some embodiments, the calibration controller 435 determines the calibration information by solving a joint estimation problem over the trajectory of the DUT 402. The joint estimation problem is solved over the motion of the DUT 402 and the calibration information using fiducial detections in the image and associated IMU measurements (e.g., force/acceleration and angular velocity measurements). In some embodiments, the calibration controller 435 estimates the DUT motion as discrete poses with 6 Dofs. In other embodiments, calibration controller 435 estimates them as a spline parametrizing the two actuator angles. The calibration controller 435 may incorporate information from the actuators of the moveable platform into the estimation problem. For example, the calibration controller 435 may use the angles directly, in others, the calibration controller 435 may use the angles in a prior estimation. Additionally, in some embodiments, the calibration controller 435 refines station parameters such as axis alignment.

In some embodiments, the calibration controller 435 determines an initial estimate of calibration information of the DUT 402 and optimizes the calibration information with an algorithm performed by a computer-implemented set of instructions. In certain embodiments, the DUT 402 is fully calibrated once the calibrated model fits the data to such a degree that the remaining errors can be explained by the uncertainty in a blob centroid localization process. Once the calibration information has been fully optimized, the calibration information is stored to a memory of the DUT 402 undergoing calibration. The calibration information may include, e.g., extrinsic information of the cameras on the DUT 402 (e.g., a location and orientation of each cameras on the DUT 402), intrinsic information of the cameras (e.g., distortion parameters, focal length, center projection on an image plane, etc.), extrinsic information of the IMU (e.g., a location and orientation of each IMU on the DUT 402), and intrinsic information of the IMU of the DUT 402 (e.g., sensor offsets (biases), sensor sensitivities (scale factors), sensor non-orthogonality's (cross-talk), etc.).

The calibration information of the DUT 402 allows the DUT 402 to determine its location within an environment of the DUT 402 and to accurately map locations in the environment to locations on the sensor of each camera of the DUT 402.

Figure 5:
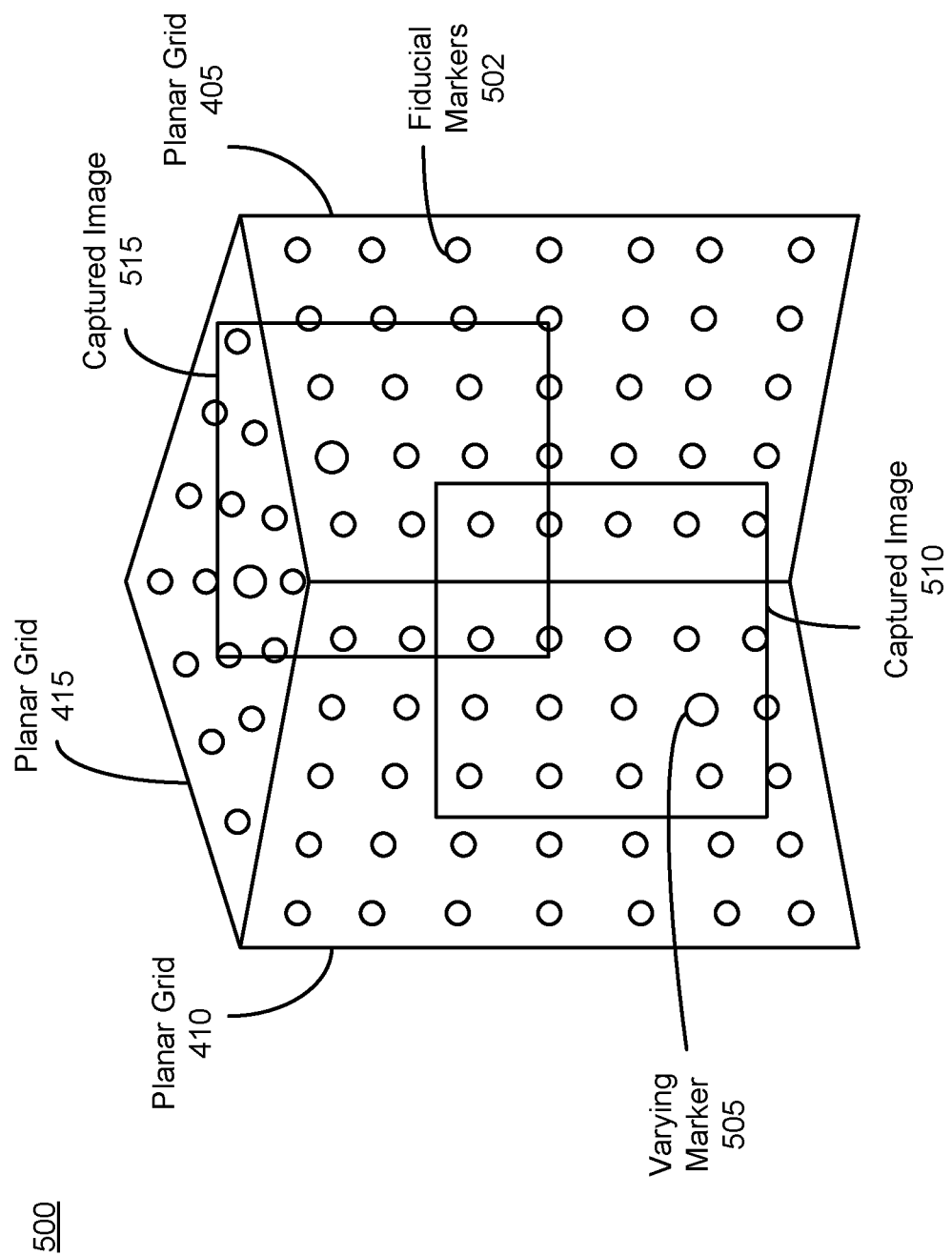
FIG. 5 illustrates a perspective view of grid assembly of the calibration system of FIG. 4, according to one or more embodiments.

FIG. 5 illustrates a perspective view of a grid assembly 500 of the calibration system of FIG. 5, according to an embodiment. The perspective view shown is a fish-eye projection from the viewpoint of the DUT 402 secured to the platform 420 in the calibration system 400 illustrated in FIG. 4.

The planar grids 405, 410, 415 comprise a plurality of fiducial markers 502. The DUT 402 captures images of the fiducial markers 502, which are used to determine calibration information of the DUT 402. The fiducial markers 502 are configured to be presented by the electronic displays and can be a variety of shapes, e.g. circles, squares, or any other regular polygon. The fiducial markers 502 are arranged in a specific pattern such that the location of each fiducial marker on the planar grids 405, 410, 415 is known. The fiducial markers 502 may vary in size. In the embodiment of FIG. 5, planar grid 410 has a plurality of varying markers 505 that serve as points of reference to identify the location of the surrounding fiducial markers 502. This is useful as in some embodiments, the DUT 402 sees a portion of, but not the entirety of the planar grids 405, 410, 415.

The DUT 402 captures a plurality of images, such as captured image 510 and the captured image 515, which the calibration controller 435 analyzes to determine calibration information of the DUT 402. The captured images 510, 515 illustrate the positioning of the DUT 402 before the planar grids 405, 410, 415 such that the captured images 510, 515 include a portion of the fiducial markers of one or more planar grids 405, 410, 415. As illustrated in FIG. 5, the DUT 402 captures images of different portions of the planar grids 405, 410, 415 due to the motion of the DUT 402 during the motion sequence. In addition, the captured images 510, 515 are filled completely by the planar grids 405, 410, 415.

After the DUT 402 captures a plurality of captured images (e.g., 510, 515), the calibration controller 435 selects captured images for analysis to determine calibration information of the DUT 402. In the embodiment of FIG. 5, a plurality of pixels within the selected captured images contains data corresponding to the fiducial markers 502 of one or more planar grids 405, 410, 415.

FIG. 6 is a flowchart illustrating a process 600 for calibrating a DUT (e.g., the DUT 402) using the calibration system 400 of FIG. 4, according to one or more embodiments. The process 600 of FIG. 6 is performed by the components of the calibration system 400 (e.g., the calibration controller, the platform actuator, or some combination thereof). Other entities (e.g., a peripheral device and/or a console of an artificial reality system) may perform some or all of the steps of the process in other embodiments. Likewise, embodiments may include different and/or additional steps, or perform the steps in different orders.

The calibration system 400 moves 610 a platform coupled to a device under test (DUT) to a plurality of test positions in accordance with a motion sequence. Each test position is reached by a rotation about at most two different axes, and as the DUT moves through the motion sequence, at least one camera on the DUT captures image information describing portions of the grid assembly (e.g., one or more planar grids, corner assembly, etc.) and an IMU on the DUT captures IMU information.

The calibration system 400 determines 620 calibration information for the at least one camera on the DUT and for the IMU based in part on a parameterized model of the motion sequence of the DUT, the captured image information, and the captured IMU information. In some embodiments, the calibration system 400 models one or more trajectories of the DUT during the motion sequence. The plurality of test positions may include a plurality of trajectories, wherein each trajectory is between adjacent test positions. In some embodiments, the calibration controller 435 determines the calibration information by solving a joint estimation problem over the trajectory of the DUT. The joint estimation problem is solved over the motion of the DUT 402 and the calibration information using fiducial detections in the image and associated IMU measurements (e.g., force/acceleration and angular velocity measurements).

In some embodiments, the calibration system 400 may predict IMU information and image information that would be received from the cameras and the IMU along the trajectory. The calibration system 400 may predict the IMU information and the image information by parameterizing the motion of the DUT. In some embodiments, the calibration system 400 predicts grid detection/feature association of the DUT, which represents which fiducial markers on the planar grids are captured and how well the fiducial markers map to a specific location within an image. The calibration system may optimize the prediction data versus the actual data using non-linear optimization to determine calibration information. For example, from each captured image of the captured image information, the calibration system 400 extracts blobs, which each represent a fiducial marker on one of the planar grids. Each blob is associated with an x-coordinate and a y-coordinate on a specific planar grid. In addition, each captured image is associated with its corresponding IMU data based on the time of capture during the motion sequence. The captured IMU and image information is then compared to the predicted IMU and image information to determine the calibration information of the headset 100. The calibration information may include the camera intrinsic information, the camera extrinsic information, the IMU intrinsic information, the IMU extrinsic information, or some combination thereof.

The calibration system 400 updates 630 the DUT with the determined calibration information. For example, the calibration system 400 may exported the calibration information to the DUT. And the DUT may calibrate one or more of its camera and/or IMUS using the calibration information.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A calibration system comprising:
   a grid assembly including at least one planar grid;
   a platform configured to couple to a device under test (DUT), the platform configured to move the DUT to a plurality of test positions in accordance with a motion sequence, wherein each test position is reached by a rotation about at most two different axes, and as the DUT moves through the motion sequence, at least one camera on the DUT captures image information describing portions of the grid assembly and an inertial measurement unit (IMU) on the DUT captures IMU information; and
   a calibration controller configured to:
      determine calibration information for the at least one camera on the DUT and for the IMU based in part on a parameterized model of the motion sequence of the DUT, the captured image information, and the captured IMU information,
      wherein the at least one camera and the IMU are calibrated using the calibration information for the at least one camera and for the IMU.

2. The calibration system of claim 1, wherein the grid assembly includes three planar grids positioned relative to each other to form a corner structure.

3. The calibration system of claim 2, wherein the corner structure comprises:
   a first planar grid comprising a first plurality of fiducial markers, the first planar grid positioned at a first angle to an alignment axis;
   a second planar grid comprising a second plurality of fiducial markers, the second planar grid positioned at a second angle to the alignment axis and a side of the first planar grid and a side of the second planar grid are adjacent to each other; and
   a third planar grid comprising a third plurality of fiducial markers, the third planar grid positioned above the first planar grid and the second planar grid and centered about the alignment axis, a side of the third planar grid adjacent to a portion of the first planar grid and a portion of the second planar grid.

4. The calibration system of claim 3, wherein the first, second, and third pluralities of fiducial markers are each arranged in a grid pattern, and at least one of the fiducial markers in each plurality of fiducial markers is configured to serve as a reference point for a particular location on the respective planar grid.

5. The calibration system of claim 4, wherein the calibration controller is configured to command the first, second, and third planar grids to display the first, second, and third pluralities of fiducial markers in accordance with a display pattern.

6. The calibration system of claim 5, wherein the command includes instructions comprising: a selection of one or more fiducial markers to display, a time point at which to display the one or more selected fiducial markers, and a duration of time to display the one or more selected fiducial markers.

7. The calibration system of claim 1, wherein the calibration information for the IMU is comprises: a position of the IMU on the DUT and an orientation of the IMU on the DUT.

8. The calibration system of claim 1, wherein the calibration information for the at least one camera comprises a camera focal length and a position of the at least one camera on the DUT.

9. The calibration system of claim 1, wherein the rotation about two different axes is selected from a group consisting of: a rotation about a first axis, a rotation about a second axis that is orthogonal to the first axis, and a rotation about the first axis and a rotation about the second axis.

10. The calibration system of claim 9, wherein the first axis is parallel to an alignment axis, and the first axis and the second axis are not parallel with a gravity vector.

11. A method comprising:
    moving a platform coupled to a device under test (DUT) to a plurality of test positions in accordance with a motion sequence, wherein each test position is reached by a rotation about at most two different axes, and as the DUT moves through the motion sequence, at least one camera on the DUT captures image information describing a grid assembly and an inertial measurement unit (IMU) on the DUT captures IMU information; and
    determining calibration information for the at least one camera on the DUT and for the IMU based in part on a parameterized model of the motion sequence of the DUT, the captured image information, and the captured IMU information,
    wherein the at least one camera and the IMU are calibrated using the calibration information for the at least one camera and for the IMU.

12. The method of claim 11, further comprising:
    sending a command to the grid assembly to display a plurality of fiducial markers in accordance with a display pattern.

13. The method of claim 12, wherein the command is selected from a group consisting of: a selection of one or more fiducial markers to display, a time point at which to display the one or more selected fiducial markers, and a duration of time to display the one or more selected fiducial markers.

14. The method 11, wherein the grid assembly is composed of one or more planar grids that each include a respective set of fiducial markers, the method further comprising:
    parameterizing a model of the motion sequence of the DUT;
    predicting IMU information and image information of each of the cameras on the DUT using the parameterized model; and
    predicting a mapping of a position of each fiducial marker on each of the one or more planar grids to a specific location within a captured image.

15. The method of claim 14, wherein determining the calibration information for the at least one camera on the DUT and for the IMU based in part on the parameterized model of the motion sequence of the DUT, the captured image information, and the captured IMU information, comprises:
    optimizing the predicted IMU and the predicted image information versus the captured IMU and the captured image information.

16. A non-transitory computer-readable storage medium storing instructions that, when executed by one or more processors, cause the one or more processors to perform operations comprising:

moving a platform coupled to a device under test (DUT) to a plurality of test positions in accordance with a motion sequence, wherein each test position is reached by a rotation about at most two different axes, and as the DUT moves through the motion sequence, at least one camera on the DUT captures image information describing portions of a grid assembly and an inertial measurement unit (IMU) on the DUT captures IMU information; and determining calibration information for the at least one camera on the DUT and for the IMU based in part on a parameterized model of the motion sequence of the DUT, the captured image information, and the captured IMU information, wherein the at least one camera and the IMU are calibrated using the calibration information for the at least one camera and for the IMU.

17. The computer-readable medium of claim 16, the instructions further comprising instructions for sending a command to the grid assembly to display a plurality of fiducial markers in accordance with a display pattern.

18. The computer-readable medium of claim 17, wherein the command is selected from a group consisting of: a selection of one or more fiducial markers to display, a time point at which to display the one or more selected fiducial markers, and a duration of time to display the one or more selected fiducial markers.

19. The computer-readable medium of claim 16, wherein the grid assembly is composed of one or more planar grids that each include a respective set of fiducial markers, the instructions further comprising instructions for:

parameterizing a model of the motion sequence of the DUT;

predicting IMU information and image information of each of the cameras on the DUT using the parameterized model; and predicting a mapping of a position of each fiducial marker on each of the one or more planar grids to a specific location within a captured image.

20. The computer-readable medium of claim 19, wherein determining the calibration information for the at least one camera on the DUT and for the IMU based in part on the parameterized model of the motion sequence of the DUT, the captured image information, and the captured IMU information, comprises:

optimizing the predicted IMU and the predicted image information versus the captured IMU and the captured image information.

\* \* \* \* \*

UNITED STATES PATENT AND TRADEMARK OFFICE
CERTIFICATE OF CORRECTION

PATENT NO. : 10,992,928 B1
APPLICATION NO. : 16/890523
DATED : April 27, 2021
INVENTOR(S) : Joern Rehder et al.

Page 1 of 1

It is certified that error appears in the above-identified patent and that said Letters Patent is hereby corrected as shown below:

In the Claims

In Column 16, Claim 14, Line 46, delete "method" and insert -- method of claim --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*